Figure 1:
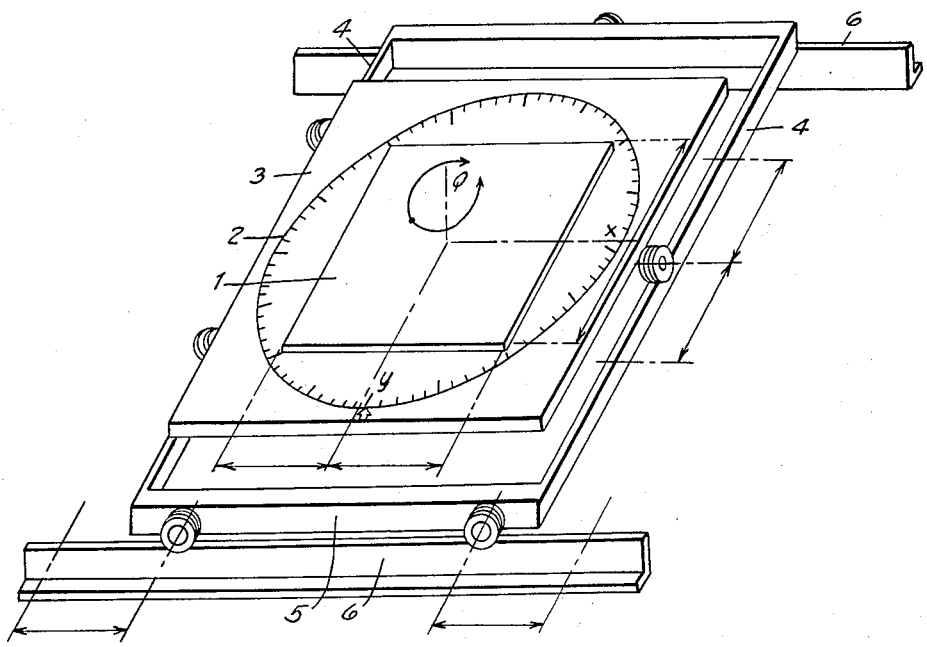

Nov. 15, 1960     U. BARTORELLI     2,960,006

THREE-PICTURE RADIAL TRIANGULATING STEREOCOMPARATOR

Filed May 7, 1957     4 Sheets-Sheet 1

*INVENTOR.*
*Ugo Bartorelli*
BY

ATTORNEYS

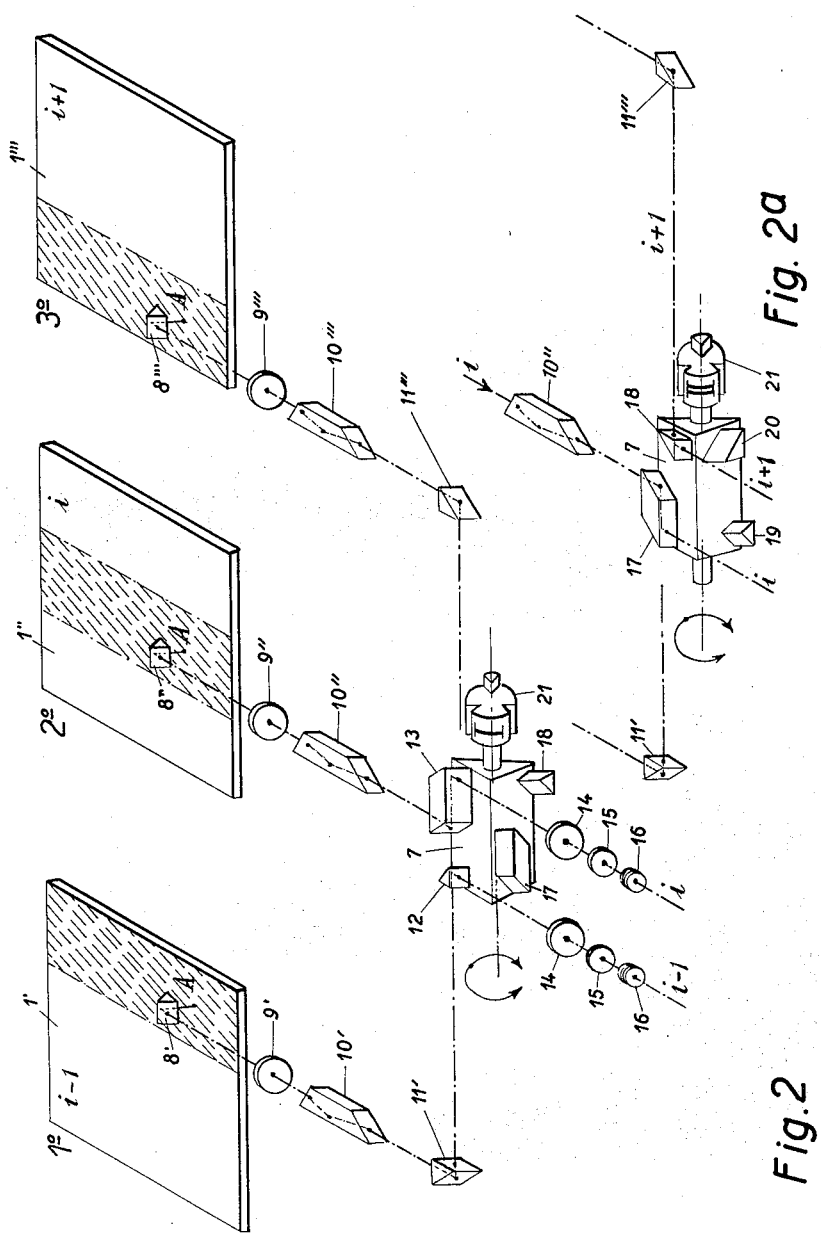

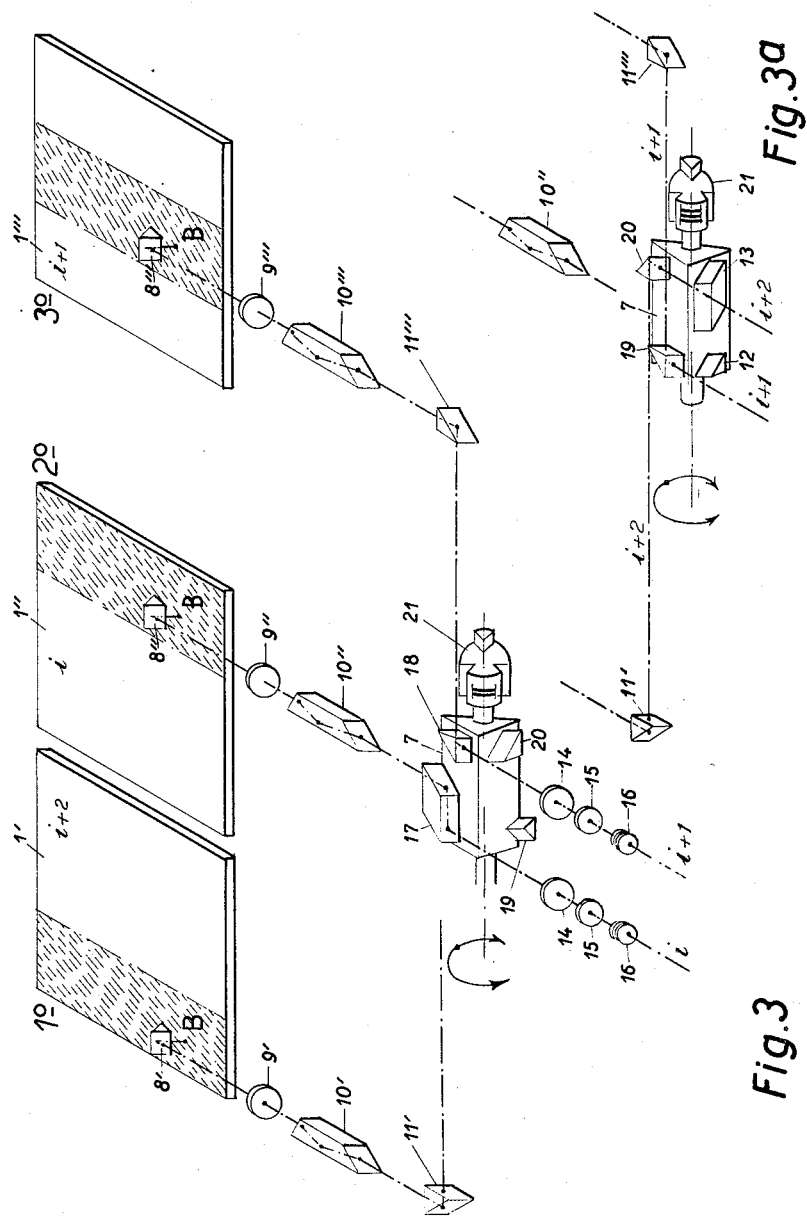

Nov. 15, 1960   U. BARTORELLI   2,960,006
THREE-PICTURE RADIAL TRIANGULATING STEREOCOMPARATOR
Filed May 7, 1957   4 Sheets-Sheet 4
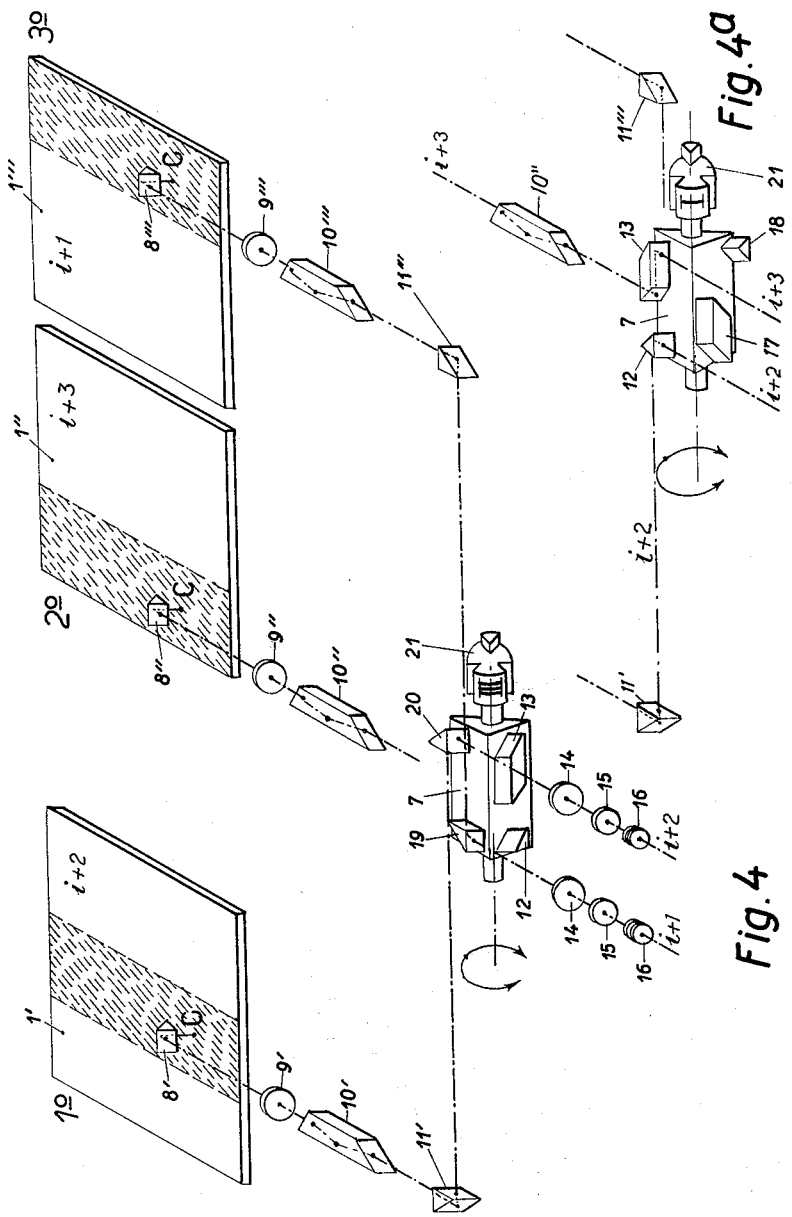
INVENTOR.
Ugo Bartorelli
BY
ATTORNEYS

2,960,006

THREE-PICTURE RADIAL TRIANGULATING STEREOCOMPARATOR

Ugo Bartorelli, Rome, Italy, assignor to Ottico Meccanica Italiana e Rilevamenti Aerofoto-grammetrici, Soc. p. Az., Rome, Italy Filed May 7, 1957, Ser. No. 657,562

Claims priority, application Italy May 24, 1956

3 Claims. (Cl. 88—29)

The invention described herein relates to a radial triangulating stereocomparator designed to allow the immediate passage from the stereoscopic viewing of a point, in a pair of pictures, to the stereoscopic viewing of the same point in the following pair, and so on indefinitely for all pictures of an aerophotogrammetric strip.

Aerial triangulation can be effected, in addition to using instrumental linking with the aerophotogrammetric restitution instruments, also by:

(1) Analytical methods using in the calculations the coordinates of the images of certain points on the ground, measured on the pictures either by means of stereocomparators (Cartesian coordinates) or by means of radial stereotriangulators (polar coordinates);

(2) Other graphic or mechanical methods, which require certain sightings and identifications of points, which can be done by using the instruments referred to above.

As it is known, two consecutive pictures of the aerial chain to be triangulated cover the same area of ground for over half of their size, so that any three consecutive pictures ($i-1$, $i$, $i+1$) always have in common an area of ground, the points of which can therefore be viewed stereoscopically both in the pair ($i-1$, $i$) and in the pair ($i$, $i+1$). In the areas of ground common to three consecutive pictures are selected the so-called "passage" points of the aerial triangulation, the coordinates of which are to be measured by the said instruments, or which are at least to be simply sighted and identified. Normally, two pictures at a time are introduced into such instruments so that the passage points of the area common to $i-1$, $i$, $i+1$, are viewed stereoscopically and sighted by means of the special sighting marker (and their coordinates can be measured), once when the pair ($i-1$, $i$) is introduced into the instrument, and once when the subsequent pair ($i$, $i+1$) is introduced therein. It then becomes necessary for the operator to note in the greatest and most accurate detail which were the points selected and sighted in the first pair, so that the same points can be sighted in the second pair. This is evidently a disadvantage because apart from the possibility of gross errors, there are always present sighting errors, small as they may be, due to the lack of an immediate comparison between the two sightings: to recognise the sighted points the operator, in addition to the notes taken, must use his own memory. The disadvantage becomes even more serious when, as it practically is bound to happen, the operator is relieved by another when the work is in progress. This disadvantage is a cause of errors in aerial triangulation.

In order to obviate this disadvantage the applicant has invented the radial stereocomparator-triangulator which forms the subject of this invention into which three pictures instead of two can be introduced, and which is fitted with an optical commutator, also forming part of this invention, whereby, by a simple hand control, it is possible to pass from the stereoscopic viewing of a point common to two of the three pictures to the same viewing of the same point of the other pair, and vice-versa, as many times as necessary for the operator to be satisfied with the identity of the sighting of the same point in the two pairs. And this result can be obtained regardless of whether the pictures $i-1$, $i$, and $i+1$ are positioned respectively in the order of the 1st, 2nd and 3rd picture holder of the instrument, or respectively in the 2nd, 3rd and 1st, or again in the 3rd, 2nd and 1st.

In the drawings:

Figure 1 is a perspective view of a picture holder.

Figures 2, 3 and 4 represent the general arrangement of three different versions of the instrument. Figures 2a, 3a and 4a show the commutator in different positions. For the sake of simplicity and clarity of representation of other essential details of the invention, these figures do not show the system whereby each picture holder is moved to permit the viewing of every point thereof; such system is the same for each of the three picture holders, and is shown in Fig. 1 for only one of them.

As it can be seen, each picture holder consists of a circular platen upon which is centered the picture 1 and which can rotate around the axis Q passing through the main point of the picture; platen 2 is carried by a carriage 3 which can slide in the direction Y along the guides 4; the latter in turn are carried by a carriage 5 which can slide in the direction X along the guides 6. The said rotation and the two axial movements can be measured on normal graduated scales; points to be viewed on each picture can be brought under the optical sighting device, which will be described below, either by effecting the said rotation and either of the axial movements, in which case the polar coordinates of the points will be measured (with the instrument acting as a radial stereotriangulator), or by effecting only both the axial movements X and Y, in which case the Cartesian coordinates of the point will be measured (with the instrument acting as a stereocomparator). When the reading of such coordinates is not necessary, the instrument serves only as a sighter and identifier of points.

The picture holders shown in Figs. 2, 3 and 4 are the same as that shown in Figure 1, but are illustrated diagrammatically for the sake of simplicity.

Fig. 2 illustrates the case in which the three pictures $i-1$, $i$ and $i+1$ are arranged respectively in the 1st, 2nd and 3rd picture holder. On the pictures, the lined areas show the zone common to the three pictures; the pictures are shown in the position permitting the sighting on all three pictures of the same point A. This has been attained by manipulating the picture holders in the manner hereinabove described.

For the sighting, the optical path is of the type normally used in similar instruments, except for the optical commutator 7 which forms part of the present invention.

The pictures are lighted from below; the lens 9′, 9″ or 9‴ projects in parallel rays the image of the portion of picture beneath the prism 8′, 8″, or 8‴ which reflects it in the direction of the said lens.

Along the parallel-ray path are positioned the Amici-Dove prism 10′, 10″ or 10″ and also, for the 1st picture holder, the right-angle prisms 11′ and 12 and for the 2nd picture holder the lozenge prism 13; the latter three prisms are used, in an obvious manner, to align the path of the parallel rays with the axis of the sighting binocular, the image of the 1st picture and 2nd picture being respectively on the left and on the right. Such images are captured by lenses 14, which make them converge on the glass plates 15 onto which are etched the sighting marks common to all similar instruments; images and marks are viewed by the operator through the oculars 16; by appropriately rotating the Amici-Dove prisms 10, the images of the respective portions of the pictures are oriented with respect to each other so as to obtain the stereoscopic collimation of point A of pictures $i-1$ and $i$.

It should be noted that the prism 12 and the lozenge prism 13 are mounted on one of the sides of the triangular section metal prism forming the optical commutator 7. In the figures, the latter is shown in position I, but by actuating the three-position control 21 it can be rotated 120° into position II shown in Fig. 2(a); on the new face replacing that bearing the prism 12 and the lozenge prism 13 are now the lozenge prism 17 and the right-angle prism 18 which, by their position, lead the image of picture holder 2 into the left ocular, and the image of picture holder 3 into the right ocular; in this position II the operator views stereoscopically the same point A on the pair of pictures $i$ and $i+1$. The transition from stereoscopic sighting $i-1$, $i$, to stereoscopic sighting $i$, $i+1$ is immediate and follows the passage from position I to position II of the optical commutator 7, which is actuated by the hand control 21.

Figure 3 illustrates the case of picture $i$, $i+1$ and $i+2$ arranged respectively on picture holders 2, 3 and 1. With an optical path similar to those illustrated above, we find that in the position II of the optical commutator 7 point B in the pair $i$, $i+1$, is steroscopically viewed; but when, by means of the hand control 21 the optical commutator is rotated by a further 120° into position III (Fig. 3(a)), the third face of the metal prism which is offered to the optical path carries two right-angle prisms 19 and 20 arranged in such a fashion that the image from the 3rd picture holder is led to the left ocular, while that from the 1st picture holder is led to the right ocular.

Thus, in position III point B of the pair $i+1$, $i+2$, is viewed stereoscopically; the two stereoscopic sightings are repeated by passing successively from commutator position II to position III and viceversa.

Lastly, Figures 4 and 4(a) illustrate the case where pictures $i+1$, $i+2$, $i+3$ are arranged respectively in picture holders 3, 1 and 2.

Similarly to the process described above, when with the further 120° rotation from position III the optical commutator 7 is brought back to position I, and vice versa, a stereoscopic sighting is taken of point C both in the pair $i+1$, $i+2$, and in the pair $i+2$, $i+3$.

An important feature of the system, which makes it particularly suited to aerial triangulation, is that the pictures to be measured are placed into the instrument in the same order in which they are to be measured, each retaining its position until measurements on it are completed. In an aerial chain of pictures, numbered from 1 to $n$, the pictures will be arranged in the holders in the following positions, in each of which measurements are taken at a certain number of passage points:

| Picture Holder | | | Remove picture— | and replace with picture— |
|---|---|---|---|---|
| 1st | 2nd | 3rd | | |
| 1 | 2 | 3 | 1 | 4 |
| 4 | 2 | 3 | 2 | 5 |
| 4 | 5 | 3 | 3 | 6 |
| 4 | 5 | 6 | 4 | 7 |
| 7 | 5 | 6 | 6 | 8 |
| $3p$ | $3p+1$ | $3p+2$ | $3p$ | $3(p+1)$ |
| $3(p+1)$ | $3p-1$ | $3p+2$ | $3p+1$ | $3(p+1)+1$ |
| $3(p+1)$ | $3(p+1)+1$ | $3p+2$ | $3p+2$ | $3(p+1)+2$ |
| $3(p+1)$ | $3(p+1)+1$ | $3(p+1)+2$ | $3(p+1)$ | $3(p+2)$ |

What I claim is:

1. A stereocomparator for the sighting and measuring of cartesian or polar coordinates, particularly for aerial triangulations, said comparator comprising, in combination, three picture holders, each of said picture holders comprising a rotary image-receiving platen, and means supporting said platen and shifting it in two directions perpendicular to each other; optical means carried by the platens of the three picture holders for projecting in the same direction the same point upon three consecutive images upon said three picture holders, optical means selectively receiving and collecting any two of the three projections, and means presenting for right eye and left eye viewing the two projections received by the last-mentioned means, wherein the means receiving and collecting the three projections consist of a rotary optical commutator, said commutator being rotatable into three positions, image-receiving and reflecting elements carried by said commutator and receiving in one of said positions projections from the first and second picture holders for transmission to said viewing means, image-receiving and reflecting elements carried by said commutator and receiving in another one of said positions projections from the second and third picture holders for transmission to said viewing means, and image-receiving and reflecting elements carried by said commutator and receiving in the third position projections from the third and first picture holders for transmission to said viewing means.

2. A radial triangulating stereocomparator for the sighting and measuring of cartesian or polar coordinates, said comparator comprising, in combination, three picture holders, each of said picture holders comprising a rotary image-receiving platen, and means supporting said platen and shifting it in two directions perpendicular to each other, separate reflecting means carried by the platens of the three picture holders for projecting in parallel directions the same point upon three consecutive images upon said three picture holders, separate image forming and reflecting means receiving each of said projections and reflecting the images formed by said projections to a common point, image receiving and collecting means located adjacent to said common point and comprising three different sets of image receiving and reflecting elements movable selectively into said common point for selectively receiving and reflecting any two of said three projections, and means presenting for right eye and left eye viewing the two projections received by the last-mentioned means.

3. A stereocomparator in accordance with claim 2, wherein the means receiving and collecting the three projections consist of a rotary optical commutator, said commutator being rotatable into three positions, said commutator comprising an elongated member having three sides, means for selectively rotating said member about its longitudinal axis into any one of three positions, and a set of two prisms connected to each side of said triangular member and constituting image-receiving and reflecting elements, one prism on each side being a lozenge prism, and the prisms being arranged so that in one of said positions of said commutator projections from the first and second picture holders are received by one of said sets of prisms for transmission to said viewing means, in another of said positions of said commutator projections from the second and third picture holders are received by another of said sets of prisms for transmission to said viewing means, and in a third of said positions of said commutator projections from the first and third picture holders are received by the remaining set of said prisms for transmission to said viewing means.

References Cited in the file of this patent

UNITED STATES PATENTS 1,558,585    Boykow    Oct. 27, 1925